UNITED STATES PATENT OFFICE.

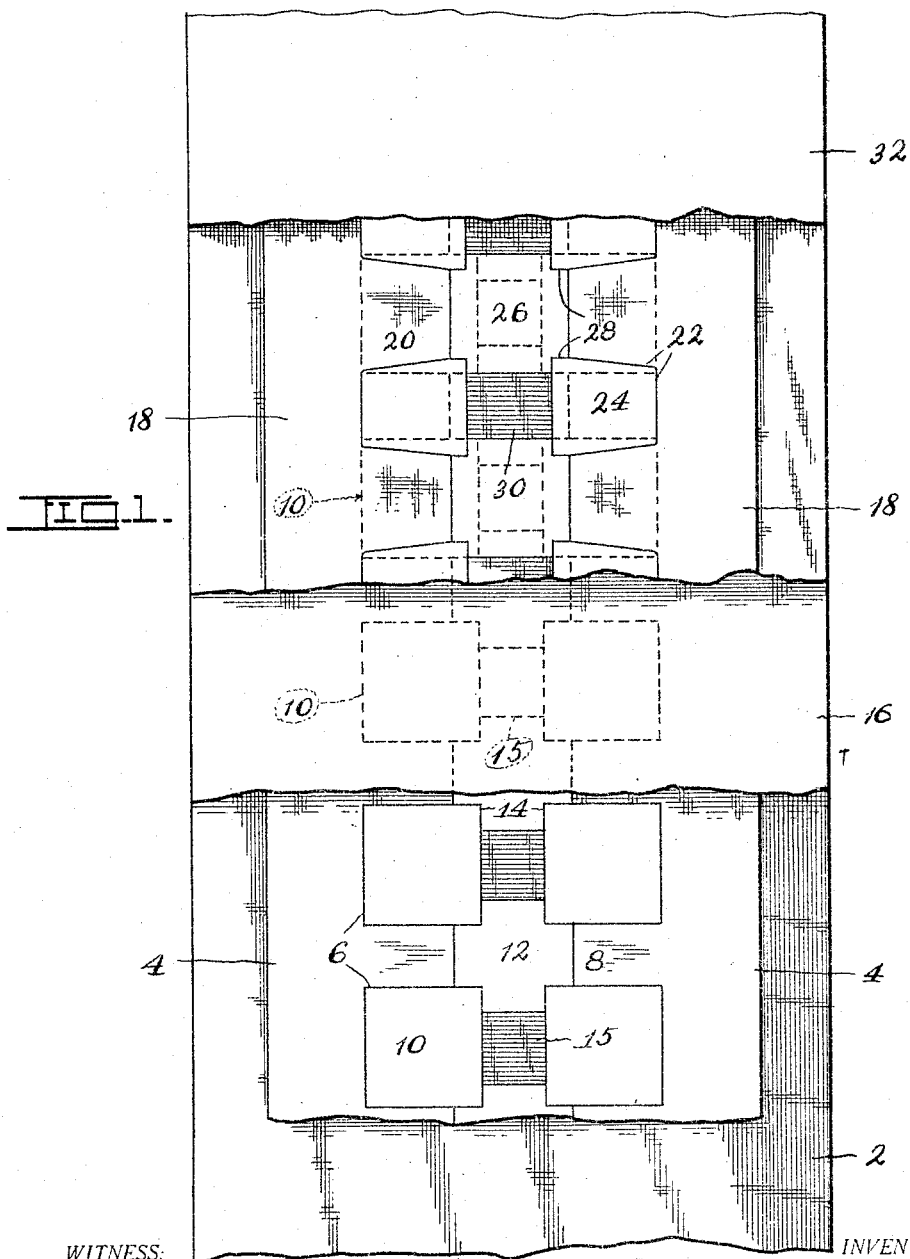

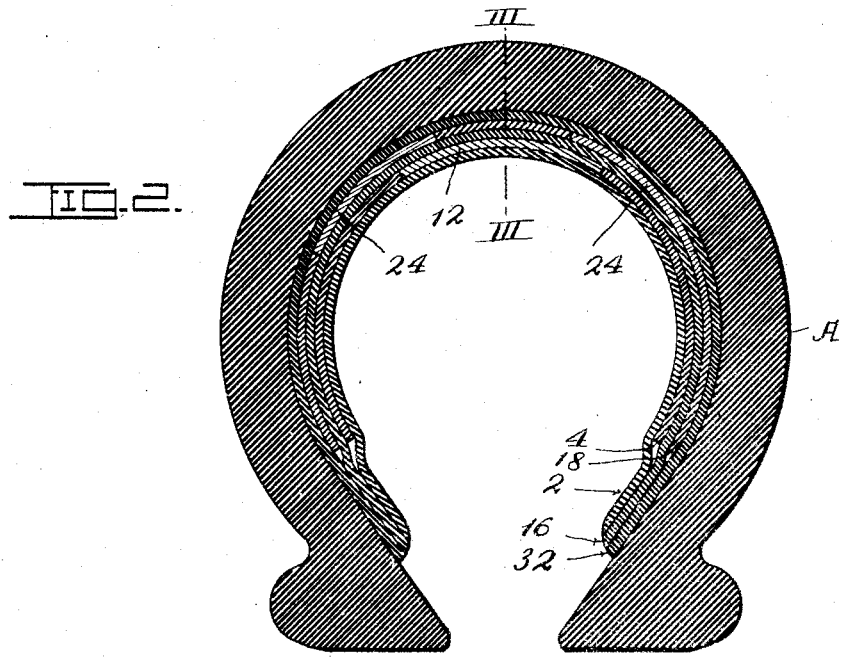
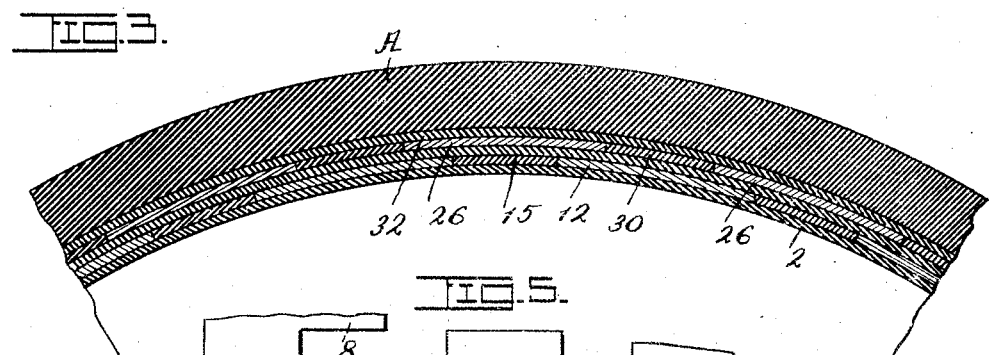
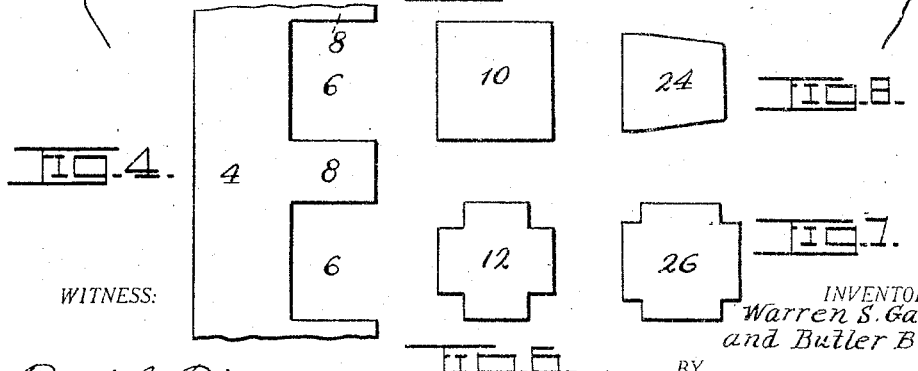

WARREN S. GAUNTT, OF ST. LOUIS, AND BUTLER B. MORRIS, OF KANSAS CITY, MISSOURI.

REINFORCEMENT FOR TIRE-CASINGS.

1,364,928. Specification of Letters Patent. Patented Jan. 11, 1921.

Application filed August 7, 1919. Serial No. 315,977.

*To all whom it may concern:*

Be it known that we, WARREN S. GAUNTT, of St. Louis, in the State of Missouri, and BUTLER B. MORRIS, of Kansas City, county of Jackson, and State of Missouri, citizens of the United States, have invented certain new and useful Improvements in Reinforcements for Tire-Casings, of which the following is a specification.

Our invention relates to reinforcements for tire casings and our object is to provide new and useful means which will prevent punctures to inner tubes and blowouts to tire casings.

The invention embodies layers of strong fabric for lining the inner surface of the tire casing and metallic plates which protect the inner tube from puncture and at the same time do not interfere with the resiliency of the tire.

In order that the invention may be fully understood, reference will now be had to the accompanying drawings, in which:

Figure 1 is a broken elevation showing the different layers of fabric and the metallic plates associated therewith.

Fig. 2 is a cross section of a tire casing equipped with the reinforcement.

Fig. 3 is a broken vertical section taken on line III—III of Fig. 2.

Fig. 4 is a broken elevation of a peculiar shaped layer of fabric constituting an important feature of the invention.

Figs. 5 to 8, inclusive, are details of different kinds of metallic plates which render the reinforcement puncture-proof.

In carrying out the invention we take an initial layer of fabric 2 having its upper surface coated with raw rubber or other cementitious material upon which a pair of relatively narrow strips of fabric 4 are then placed, sufficient pressure being used to cause said fabric 4 to adhere to the coated side of the fabric 2. The two strips of fabric 4 are arranged parallel to each other and have their longitudinal margins cut out to form recesses 6 and tongues 8.

Metallic plates 10 are then arranged in the recesses 6 and against the coated surface of the initial layer 2. The plates 6 are, preferably, square as shown and are held from edgewise movement by the margins of the recesses 6 and a plurality of metallic plates 12, having recesses 14 at their corners to receive the adjacent corners of the plates 10.

Two oppositely-disposed margins of each plate 12 abut the adjacent margins of the tongues 8, while the two other margins of each plate abut rectangular fabric patches 15 placed upon the coated surface of the fabric 2 to fill the spaces between the plates 10 and 12. The fabric 4, the plates 10 and 12, and the patches 15 are, preferably, of equal thickness so that the second layer which they constitute of the reinforcement will have a smooth surface to receive the third layer of fabric 16, which is of substantially the same width and length as the initial layer 2 to overlap the longitudinal margins of the second layer and engage and adhere to the coated surface of said initial layer 2. The third layer 16 is further secured in place by cementitious material on the upper surface of the two parallel layers 4 and the patches 15, which are treated in the same manner as the upper surface of the initial layer 2.

A pair of strips of fabric 18 are then placed upon the upper surface of the third layer 16, which has a cementitious coating for the strips 18 to adhere to. The strips 18 overlie the strips 4 and are somewhat similar in shape thereto, having tongues 20 and recesses 22 at their adjacent longitudinal margins. Metallic plates 24 are placed in the recesses 22 and are held from edgewise movement by the margins of said recesses and metallic plates 26, which latter like the plates 12 have recesses 28 at their corners to receive the adjacent corners of the plates 24.

The rectangular spaces between the plates 24 and 26 are filled with fabric patches 30, which like the plates 24 and 26 are laid upon the upper surface of the third layer of fabric 16. The plates 24 are so disposed as to overlie the tongues 8, while the plates 26 are arranged to overlie the patches 15. The plates 24 and 26 also overlap the adjacent margins of the plates 10 and 12 constituting therewith a metallic puncture-proof armor.

The parallel strips 18, the plates 24 and 26 and the patches 30 are, preferably, of equal thickness to form a smooth surface which is covered by the fifth and last layer of fabric 32. The fabric 32 is of substantially the same width as the third layer of fabric 16 to overlap the outer longitudinal margins of the strips 18 and engage the adjacent cementitious coated surface of the third layer of fabric 16. The upper surface of the strips 18 and the patches 12 also have a cementitious coating to aid in holding the final layer 32 in place. Said final layer 32 has a cementitious coating to cause it to adhere to the inner surface of the tire casing A. The layers 2, 16 and 32 are of sufficient length and width to cover the inner surface of the casing A. All of the metallic plates are curved to conform to the curvature of the casing A.

The different layers of fabric may be cemented to each other during the process of building up the reinforcement, but in practice we prefer to treat one surface of each layer with raw rubber or a self-vulcanizing composition which together with the air pressure in tire will cause the layers to firmly adhere to each other and the inner surface of the casing A, until said rubber or composition is vulcanized by the heat generated in said casing when the same is running over a road.

If preferred additional layers of fabric and metallic plates may be employed, but in practice are not required as the reinforcement described strengthens the casing A, so that it may be used until its tread is almost worn down to the final layer 32, after which the casing can be retreaded for further use.

By merely having the metal plates abut instead of rigidly connecting them to each other, they are free to accommodate themselves to all movements of the casing A, and hence will not interfere with the resiliency of the tire, at the same time reinforcing the casing from blowouts and protecting the inner tube from puncture. As disclosed on Figs. 1 and 8, the plates 24 taper toward their outer margins to reduce their width. Said plates are also spaced farther apart than the plates 10, to accommodate the movements of the casing A, which are greater at the outer surface than at the inner surface of said casing.

The reinforcement may be built up inside of the casing A, but in practice we find it more convenient to form it separately and then install the completed reinforcement in the casing.

From the foregoing description it will be readily understood that we have provided a reinforcement for tires embodying the advantages hereinbefore pointed out, and while we have shown and described the preferred construction of our reinforcement, we reserve the right to make such changes as properly fall within the spirit and scope of the claims.

Having thus described our invention, what we claim and desire to secure by Letters Patent, is:

1. A tire reinforcement consisting of a layer of fabric having one side coated with cementitious material, a pair of fabric strips placed upon the coated surface of the first layer and having their adjacent margins cut out to form tongues and recesses and their upper surface coated with cementitious material, a row of metallic plates placed in the recesses of each strip, a row of metallic plates spaced apart upon the initial layer and having their corners recessed to receive the adjacent corners of the first-mentioned plates, and a third layer of fabric placed over the second layer formed by the strips and the plates and having its upper surface coated with cementitious material to adhere to the inner surface of the tire casing.

2. A tire reinforcement consisting of a layer of fabric having one side coated with cementitious material, a pair of fabric strips placed upon the coated surface of the first layer and having their adjacent margins cut out to form tongues and recesses and their upper surface coated with cementitious material, a row of metallic plates placed in the recesses of each strip, a row of metallic plates abutting the edges of the first-mentioned plates and resting upon the coated side of the initial layer of fabric, a third layer of fabric placed over the second layer formed by the strips and the plates and having its upper surface coated with cementitious material, a pair of strips placed on the third layer and having their margins cut out to form tongues and recesses, a row of plates tapered toward their outer margins and placed in the recesses of each strip, a row of plates abutting the edges of the last-mentioned plates, and a layer of fabric placed over the fourth layer formed by the strips and plates.

In testimony whereof we affix our signatures in the presence of two witnesses.

WARREN S. GAUNTT.
BUTLER B. MORRIS.

Witnesses:
  F. G. Fischer,
  Lo. J. Fischer.